US008600965B2

(12) United States Patent
Marlow

(10) Patent No.: US 8,600,965 B2
(45) Date of Patent: Dec. 3, 2013

(54) SYSTEM AND METHOD FOR OBSERVING COMMUNICATION BEHAVIOR

(75) Inventor: Cameron Marlow, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 835 days.

(21) Appl. No.: 11/950,201

(22) Filed: Dec. 4, 2007

(65) Prior Publication Data

US 2009/0144329 A1     Jun. 4, 2009

(51) Int. Cl.
*G06F 7/00*      (2006.01)

(52) U.S. Cl.
USPC ........... 707/705; 707/754; 707/769; 709/206; 709/223

(58) Field of Classification Search
USPC ........... 707/999.101, 999.104, 705, 754, 769; 709/206, 223
See application file for complete search history.

(56) References Cited

U.S. PATENT DOCUMENTS

| 2003/0167324 | A1* | 9/2003 | Farnham et al. ............... 709/224 |
| 2004/0122855 | A1* | 6/2004 | Ruvolo et al. ............... 707/104.1 |
| 2004/0236749 | A1* | 11/2004 | Cortright et al. ................... 707/9 |
| 2005/0171799 | A1* | 8/2005 | Hull et al. ........................... 705/1 |
| 2005/0210115 | A1* | 9/2005 | Naito et al. .................... 709/206 |
| 2006/0190493 | A1* | 8/2006 | Kawai et al. ............... 707/104.1 |
| 2008/0098237 | A1* | 4/2008 | Dung et al. .................... 713/189 |

* cited by examiner

*Primary Examiner* — Hosain Alam
*Assistant Examiner* — Jieying Tang
(74) *Attorney, Agent, or Firm* — James J. DeCarlo; Greenberg Traurig, LLP

(57) ABSTRACT

A system and method for observing the communication behavior of a user, and analyzing data regarding the user's contacts and community. An electronic message (for example, from the user to a group of contacts) is intercepted and copied; the message content and message data are stored in a database. A contact value is determined (for example, a score is computed) for each contact in the community of the user. Each contact in the community is optionally assigned a ranking. Relationship data (data regarding the user's relationships with the contact and community) is extracted from the message content and message data. Statistics are compiled relating to the user, the contact, and/or the community. A list of contacts is compiled and monitored over time, thereby providing information regarding patterns of the user's behavior.

20 Claims, 9 Drawing Sheets

SYSTEM AND METHOD FOR OBSERVING COMMUNICATION BEHAVIOR

FIELD OF THE DISCLOSURE

This disclosure relates to mining and processing relationship data regarding a user of one or more electronic communication protocols, in order to provide relevant relationship information for other applications.

BACKGROUND OF THE DISCLOSURE

An individual communicates with other people in a variety of business and social networks, often using a variety of electronic protocols and services such as e-mail, instant messaging (IM), text messaging and the like. An individual user may maintain an address book for each communication system (for example, e-mail service); the address book reflects the user's network of contacts over that system. Address books do not travel across mail systems; that is, it is generally necessary for a user to maintain a separate address book for each communication service. Moreover, address books by themselves do not include useful information about the relationships of the user with other people in the network.

SUMMARY OF THE DISCLOSURE

The present disclosure provides a system and method for observing the communication behavior of a user, and analyzing data regarding the user's contacts (those with whom the user exchanges electronic messages) and community (the group, and possibly subgroups, of a user's contacts). According to one aspect of the disclosure, a method is provided which includes copying an electronic message transmitted between a user and a contact, and storing the message content and message data in a database. A contact value is determined for the contact relative to the community of the user. Relationship data (data regarding the user's relationships with the contact and community) is extracted from the message content and message data. Statistics are compiled relating to the user, the contact, and/or the community.

According to another aspect of the disclosure, a system for observing a user's communication behavior, and for compiling relationship data based on that behavior, includes a server, a communication database, and a contact engine. The server is configured to receive a copy of an electronic message transmitted between a user and a contact. The communication database is connected to the server and stores message content and associated message data. The contact engine is connected to the communication database, and is configured to determine a contact value for the contact relative to a community of the user; extract relationship data associated with the user, the contact, and/or the community from the message content and message data; and compile statistics relating to the user, the contact, and/or the community.

According to another aspect of the disclosure, a computer-readable storage medium is provided with instructions for performing the above-described method.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
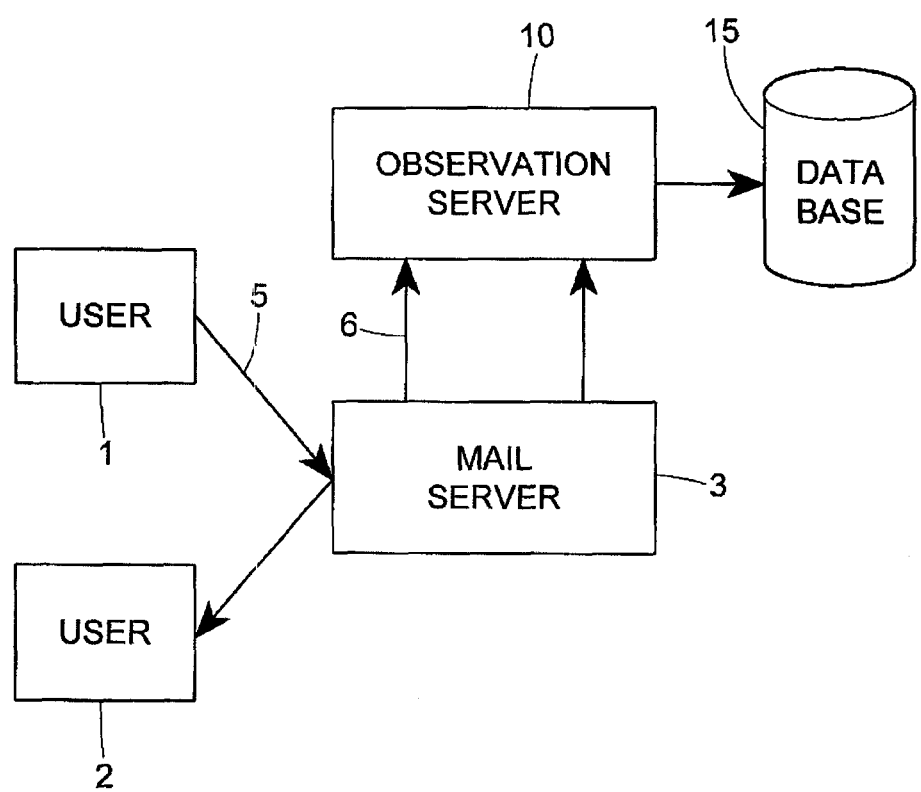
FIG. 1 is a schematic diagram of a system where an e-mail server automatically forwards blind carbon copies (bccs) of a user's e-mails to an observation server, in accordance with an embodiment of the disclosure.

A basic embodiment of the disclosure is schematically illustrated in FIG. 1. User 1 is connected to mail server 3 in order to send an email 5 to another user 2. Additional information is added to the email before it is sent from the user's device, using an automatic forwarding system known in the art, causing a blind carbon copy (bcc) 6 of the email to be sent to an observation server 10. The automatic forwarding system generally takes the form of a software add-on to the email client, and may include one of (1) client software which allows for automatic blind carbon copy (bcc) or automatic redirect of emails from a user personal computer, mobile phone, or personal digital assistant (PDA); or (2) a Web browser plugin that inserts bcc or redirect information into web-based email. The user 1 has a personalized secret address (secret key) for collecting the user's correspondence at the observation server 10. For example, if the server 10 is maintained by a service with the domain name "observice.com," a user with key "xyzsecretkey" automatically sends bccs of all emails he sends to xyzsecretkey@observice.com. The collected emails are then stored on a database 15. User 1 thus chooses to have her messages observed and collected, by a system and procedure not visible to user 2.

Figure 2:
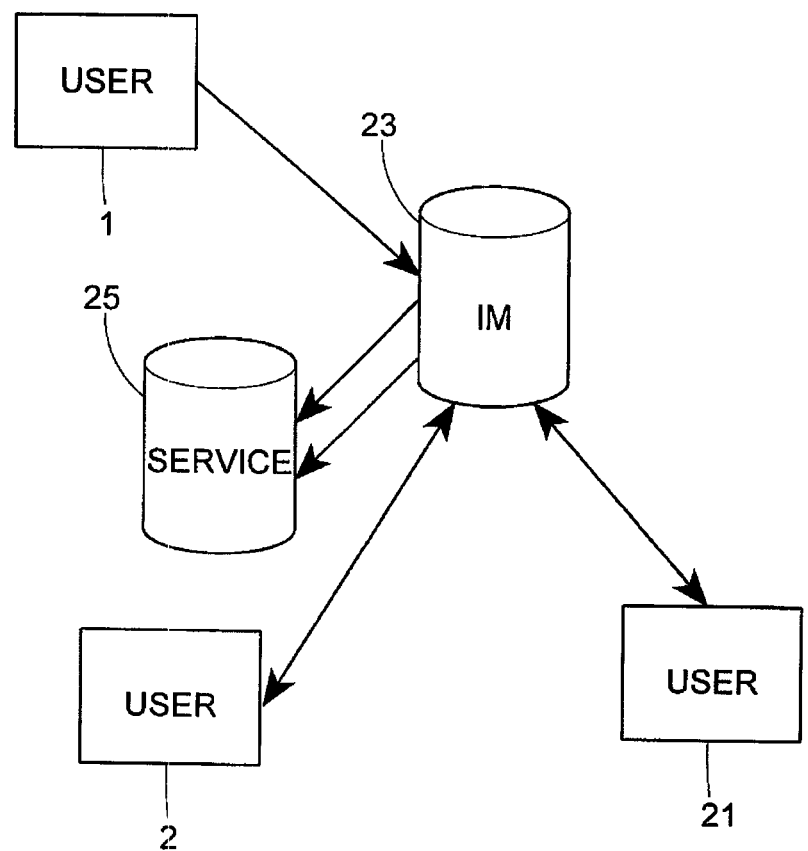
FIG. 2 is a schematic diagram of a system for passively observing and aggregating both incoming and outgoing messages of a user, in accordance with an embodiment of the disclosure.

Messages sent using other communication protocols may also be copied and collected, as shown schematically in FIG. 2. User 1 is shown logged on to her instant messaging account, e.g. AOL® Instant Messaging (AIM), and connected to the IM database 23. User 1 is engaged in instant messaging with other users 2 and 21. User 1 has also logged on to her account with observice.com. Accordingly, database 25 of observice.com receives a copy of every message sent from user 1, and every message from users 2 and 21 to user 1.

Figure 3:
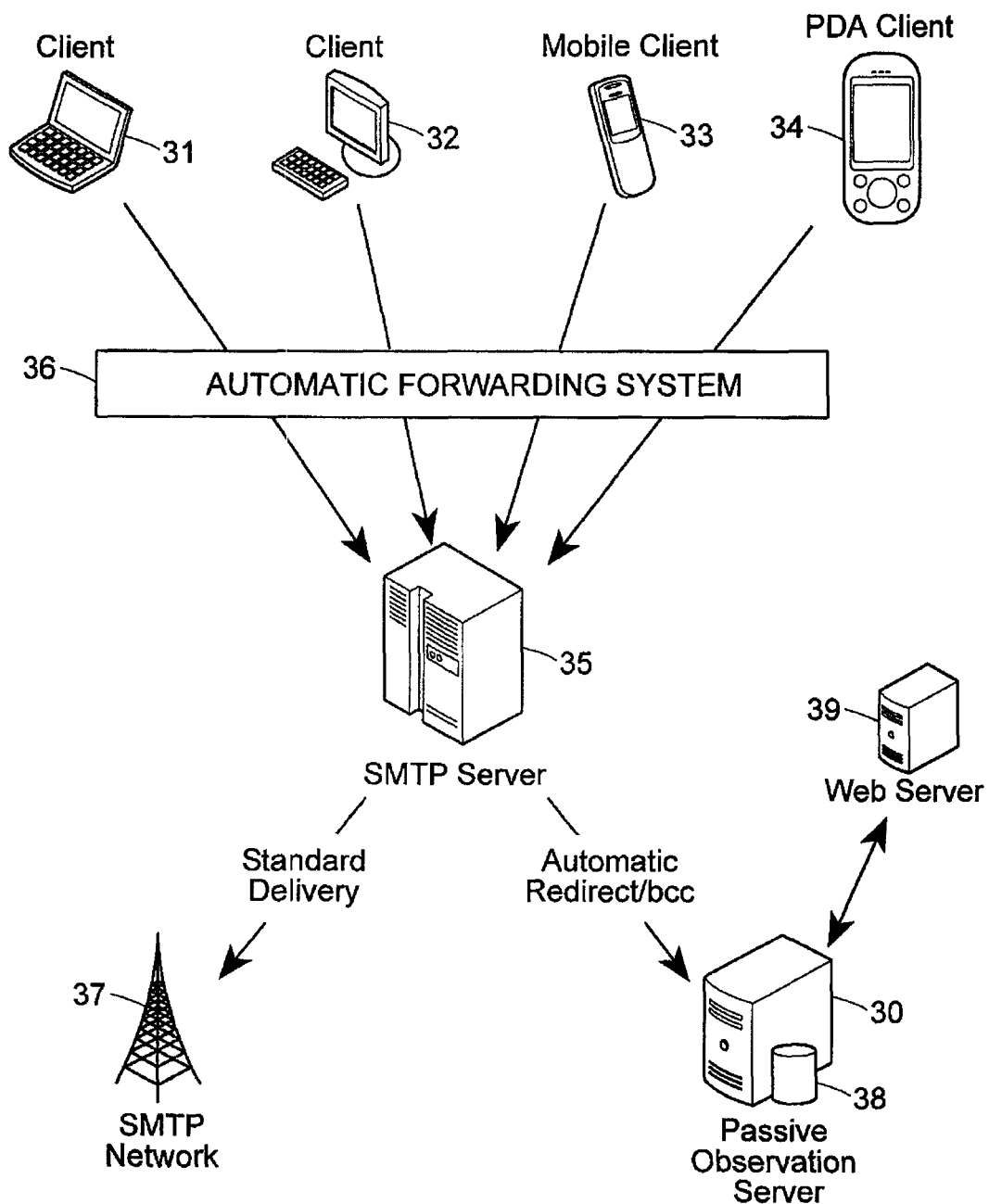
FIG. 3 is a schematic illustration of a passive observation and aggregation system for sent messages, in accordance with an embodiment of the disclosure.

FIG. 3 is a schematic illustration of a system for passive observation and aggregation of a user's messages, in accordance with an embodiment of the disclosure. A given user, or group of users, may send messages with a variety of devices, as shown in FIG. 3: a notebook computer 31, a desktop computer 32, a mobile telephone 33, and/or a PDA 34. Each of these devices is provided with client software for sending e-mail to the Simple Mail Transfer Protocol (SMTP) server 35. The client software for each device includes an automatic forwarding system 36 as discussed above. Each email is thus delivered over the SMTP network 37 to its addressee, and also copied to the passive observation server 30. Collected data regarding the message (e.g. sender ID, recipients' ID, date and time of the message, type of message, and/or the message content) is stored in database 38. The passive observation server is also connected to a Web server 39 in order to execute various applications on the collected data, as described in more detail below.

Figure 4:
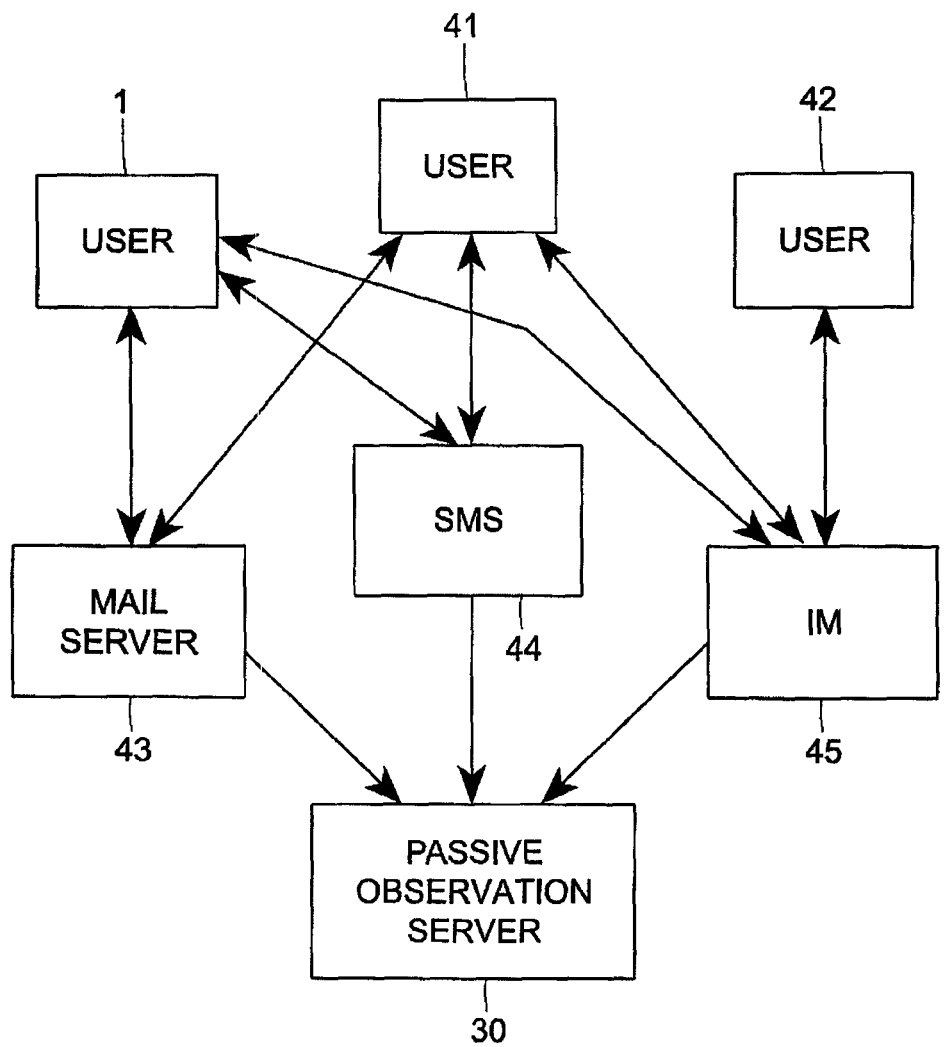
FIG. 4 is a schematic diagram of a system including a passive observation server linked to various servers accessed by different users, in accordance with an embodiment of the disclosure.

More generally, the passive observation server 30 may collect information regarding messages sent using a variety of protocols, as shown schematically in FIG. 4. User 1 and user 41 communicate by email via mail server 43, and also by text messaging via Short Message Server (SMS) 44. Meanwhile, users 1, 41 and 42 are all engaged in instant messaging via IM server 45. Since user 1 has chosen to have her messages observed, messages sent to and received from the other users are copied to the passive observation server 30. The passive observation system is configured to store and analyze information regarding messages sent from a variety of devices (e.g. PCs, PDAs), according to a variety of protocols (e.g. e-mail, IM) supported by a variety of services (e.g. Yahoo!® Mail, Hotmail®).

As shown schematically in FIG. 4, user 1 is part of a network of people that includes users 41 and 42. Analysis of the collected data for the messages of user 1 permits inferences regarding such networks, which in turn lead to inferences regarding relationships of user 1. For example, user 1 might send emails to user 41 via a personal email service as well as an email server maintained by her employer; this leads to an inference that users 1 and 41 are in a social network as well as a business network. As another example, user 1 might communicate with user 42 only by IM and never by email; this leads to an inference that user 1 does not have user 42's email address and does not know him personally. The collected data for the messages of user 1 reflects the contacts of user 1 across a variety of networks.

The passive observation system observes and stores each message from the user as it is sent, and is therefore able to observe and evaluate the user's contacts over time. The passive observation system may keep a record of each message which can include, for example, the following information:

From: sender's ID and/or address
To: recipient's ID and/or address
Time: date and time the message was sent or received by the user
Type: type of message (e-mail, text message, etc.)
Content: content of the message The passive observation system is thus configured to collect data directed to a number of observed or inferred behaviors or activities, including for example the following:

How often does the user email other people? Which people?
Who are this user's most important contacts?
What communities is the user engaged in?
What trends are apparent in the user's contacts? Which people are becoming more or less important?
Which of the user's contacts has lapsed? Should this contact be removed from the user's list of contacts?

The passive observation system is thus configured to compile statistics regarding the structure and the evolution of the user's networks. In this embodiment, the system collects statistics on recipients of different types of messages, and on multiple recipients for a single message. The system is therefore able to construct a network of relationships to the sender of the message. In particular, the passive observation system evaluates the user's contacts and discerns which are the most important.

Figure 5A:
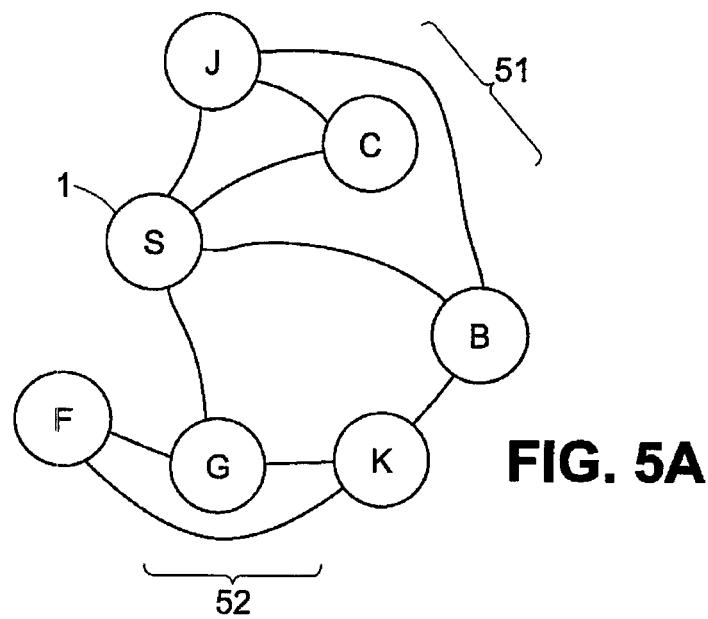
FIG. 5A is a diagram of a particular user's community, based on that user's contacts by e-mail, instant messaging (IM), text messaging, etc.
Figure 5B:
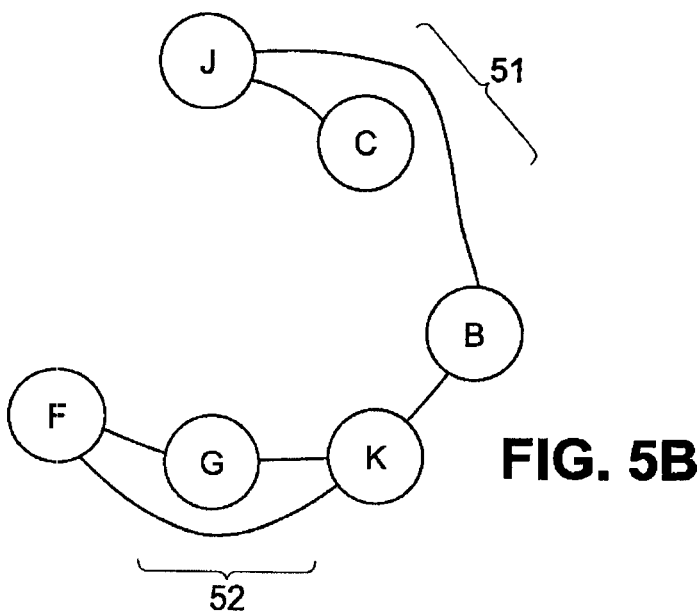
FIG. 5B is a diagram of the community of FIG. 5A with the subject user removed, thereby illustrating the relative importance of the user's contacts.

An example of a user's networks and the contacts therein is diagrammed in FIG. 5A. In this example, user 1, whose name is Sarah, belongs to a network that includes people named Bob, Cam, Fred, George, John and Kim (shown by their initials in FIG. 5A). Not everyone in Sarah's network communicates with everyone else. The passive observation system is able to discern distinct sub-networks based on Sarah's communication behavior, and thus determine "who knows who." For example, suppose that the system's analysis of the "From" and "To" addresses reveals that Sarah communicates with Cam and John only by email in the workplace, with George only by text messaging, and with Bob sometimes by workplace email and sometimes by personal email. This indicates that John, Cam and Bob are in a business network 51, while George, Bob, Fred and Kim are in a social network 52. FIG. 5B shows the same diagram with the subject user 1 (Sarah) removed. FIG. 5B shows that Bob is a "bridge contact" between networks 51 and 52, and is therefore a contact of relatively high importance (or higher contact value) for Sarah.

The passive observation system may function as a system for managing and maintaining contacts. In this example, the system would identify Bob as a valuable contact, and may send Sarah reminders to keep in contact with Bob over time.

Figure 6:
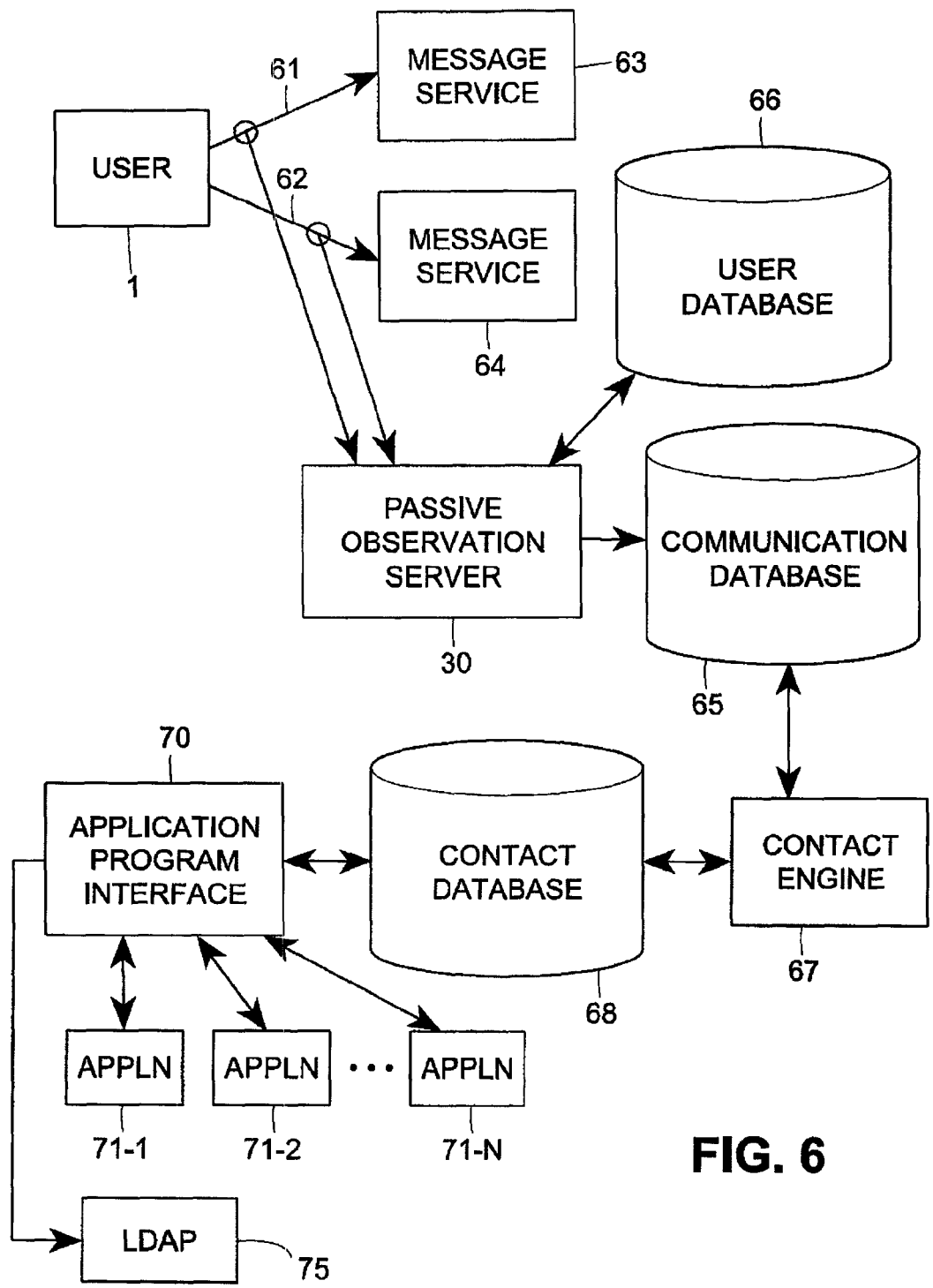
FIG. 6 is a schematic diagram of a system including including a passive observation server intercepting and storing messages sent by a user, in accordance with an embodiment of the disclosure.

Further details of the passive observation system, according to an embodiment of the disclosure, are shown in FIG. 6. FIG. 6 shows an implementation of the system for e-mail messages; it should be understood that this implementation is not specific to a particular email provider. Furthermore, as noted above, the system may be configured for use with a variety of messaging protocols.

User 1 sends messages 61, 62 using message services 63, 64 respectively. In an embodiment, the user interacts with an interface appropriate to the message protocol, so that the user's outgoing messages are intercepted and copied to the passive observation server 30. (In the case of email, for example, the interface inserts a bcc address into the message, thereby routing a copy of the message to the server 30.) The passive observation system validates the source email address and the personalized address on file for the user (e.g. stored in user database 66), thereby verifying that the message originated from user 1. Data relating to the message, including all metadata and the data detailed above, and part or all of the content of the message, are stored in communication database 65.

A contact engine 67 accesses the collected data and proceeds to mine the data for information regarding relationships and contacts, and compile statistics relevant thereto. The contact engine builds a map of the relationships, addressing the following questions, among others:

Who knows who?
How do contacts divide into different communities?
What does the map look like when the subject user is removed?
Who is a "bridge contact" between different communities?

As noted above, the map of a user's relationships is not static, but changes with respect to the user's location and the date and or time. For example, the contact engine 67 may associate a physical location with a message sender's ID and a recipient's ID using a location determination system with cellular triangulation, Global Positioning System(s) or the like. If a contact has recently moved closer to the user (perhaps because one of them is on a trip to the other's home city), the contact engine may generate a prompt to the user to send an additional message to that contact. Similarly, contact engine 67 monitors the evolution of the map over time. For example, the contact engine may note contacts with whom communications have become less frequent, and send a prompt to the user to send that contact a new message, and/or a query to the user whether that contact should be maintained. If the user has in the past sent a contact a message on a recurring basis, the contact engine may send a prompt to the user if that pattern of communication is changed.

In general, the contact engine 67 aggregates and analyzes data on multiple contacts of the user. The user's contact list may be sorted in accordance with a variety of different categories. In an embodiment, the contact engine 67 stores the contact data, including the relationship map and related statistics, in a contact database 68. Application programming interface (API) 70 gives access to this data to software applications 71-1, 71-2, ... 71-N. The contact list, and statistical data associated therewith, is sorted and manipulated according to the requirements of the various applications. The API 70 also gives access to the data to LDAP (Lightweight Directory Access Protocol) service 75. The LDAP service is used to express the contact and relationship data by conveying it in directory form. For example, all of the workplace contacts for users at a company may be presented in a company-wide directory.

Figure 7A:
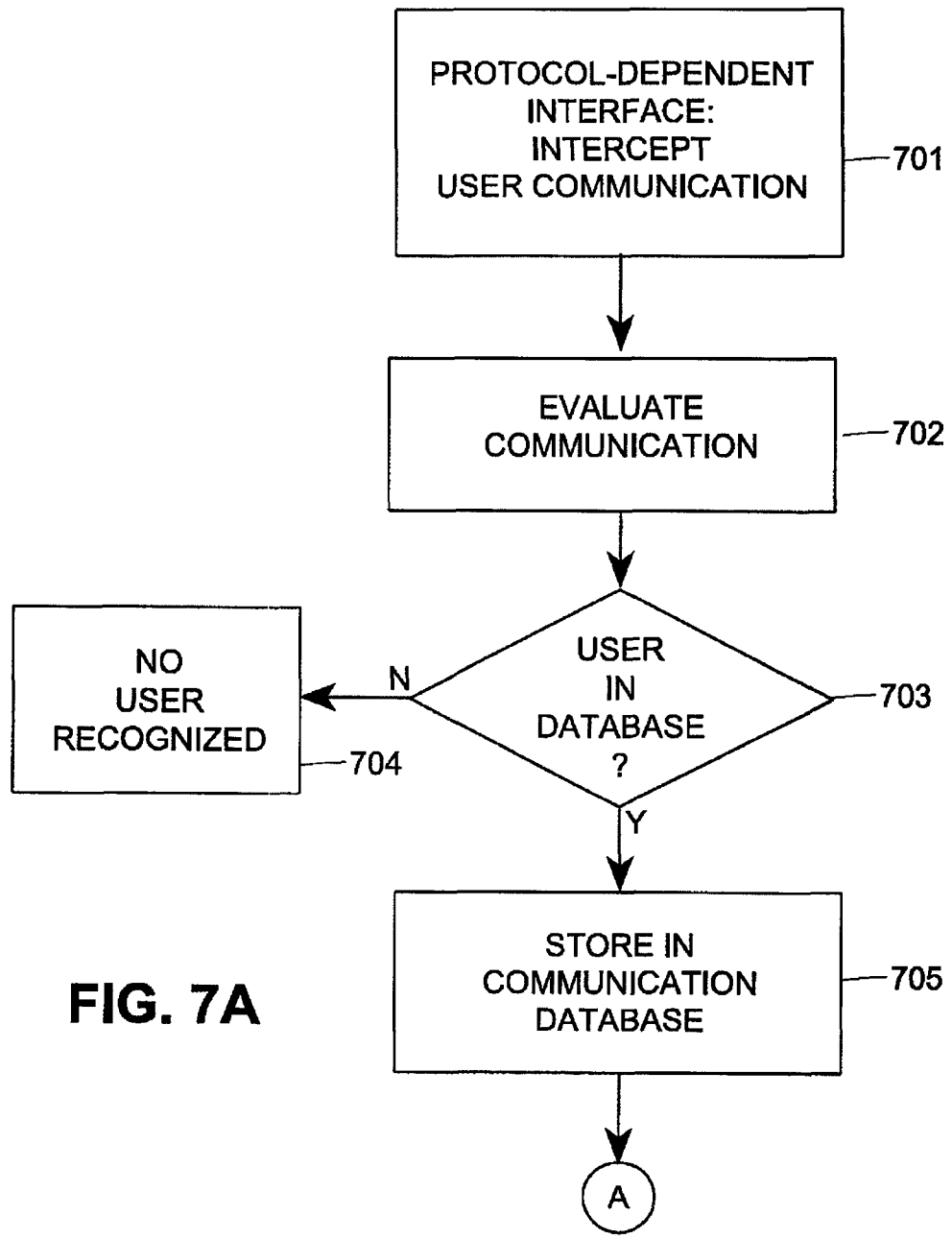
FIGS. 7A and 7B are connected flowcharts illustrating a method for intercepting, storing and evaluating messages, and evaluating a user's contacts and community, in accordance with an embodiment of the disclosure.
Figure 7B:
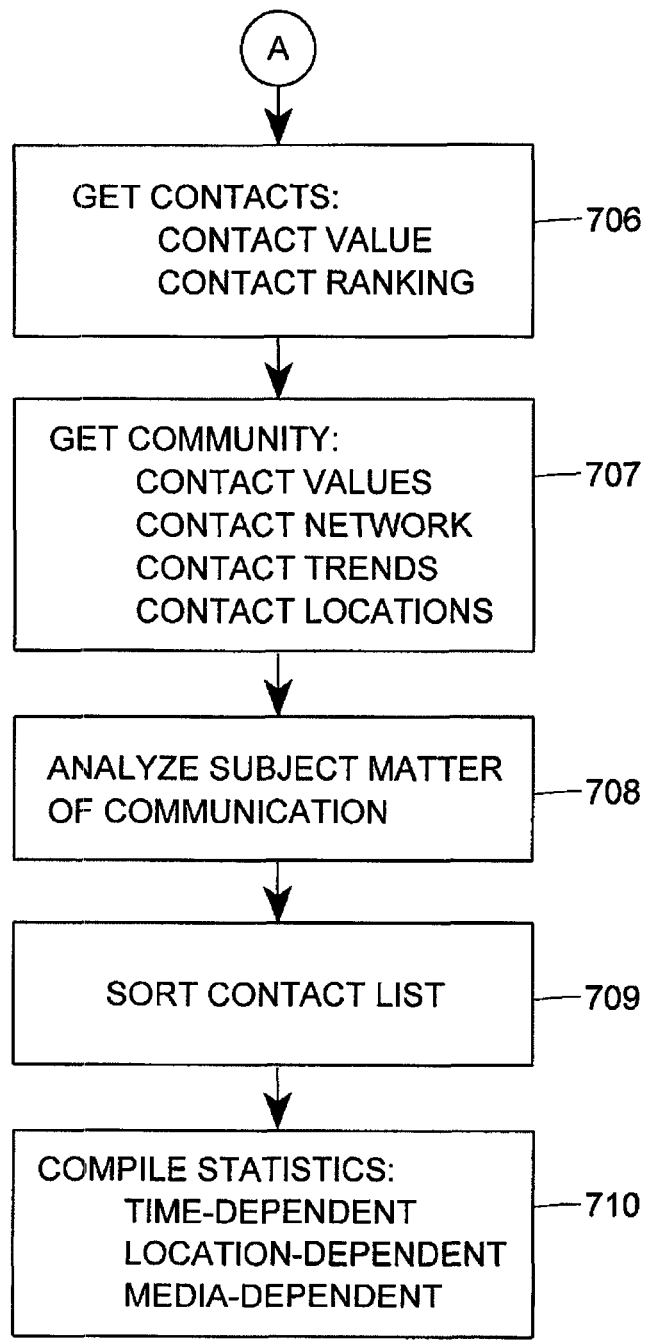

A flowchart of a method performed by the passive observation system, according to an embodiment of the disclosure, is shown in FIGS. 7A and 7B. A message, sent in accordance with a message protocol, is intercepted using an interface appropriate to that protocol (step 701). In step 702, the message is evaluated to determine if the sender or recipients are in the database of users. If the sender or one of the recipients is in the user database (step 703), then the message data is stored in the communication database (step 705). As noted above, "message data" includes the sender and recipient IDs, the time and type of the message, any associated metadata, and optionally part (and perhaps all) of the content of the message. If no user is recognized in the message (step 704), the message data is not stored.

The message data is then analyzed to yield information about the sender's contacts and community, and statistics (including time- and location-dependent statistics) relevant thereto. In step 706, the importance of each contact is determined (e.g. by computing a contact score in accordance with contact metadata to reflect the value of the contact), as well as (optionally) the ranking of each contact in the community. In step 707, information related to the community is extracted from the message; for example, which contacts in the community are listed as message recipients, the value and locations of those contacts, and/or trends relating to those contacts (such as how long ago was the last message to this group of recipients). The subject matter of the message is also analyzed for relevant community data (step 708); for example, a message with the word "party" in the subject line is likely to be directed to a social network, while a message with the word "memo" is more likely directed to a business network. The contact list is then sorted (step 709) and analyzed (step 710) in accordance with the applications given access to the stored message data by the API. Statistics are compiled to give a time-dependent, location-dependent, and/or media-dependent view of the network.

The data collected and analyzed in this process (particularly the statistical data) may be leveraged for a variety of purposes, depending on the type of network or task involved (social networking, email clients, network visualization, or any type of relationship analysis).

Figure 8:
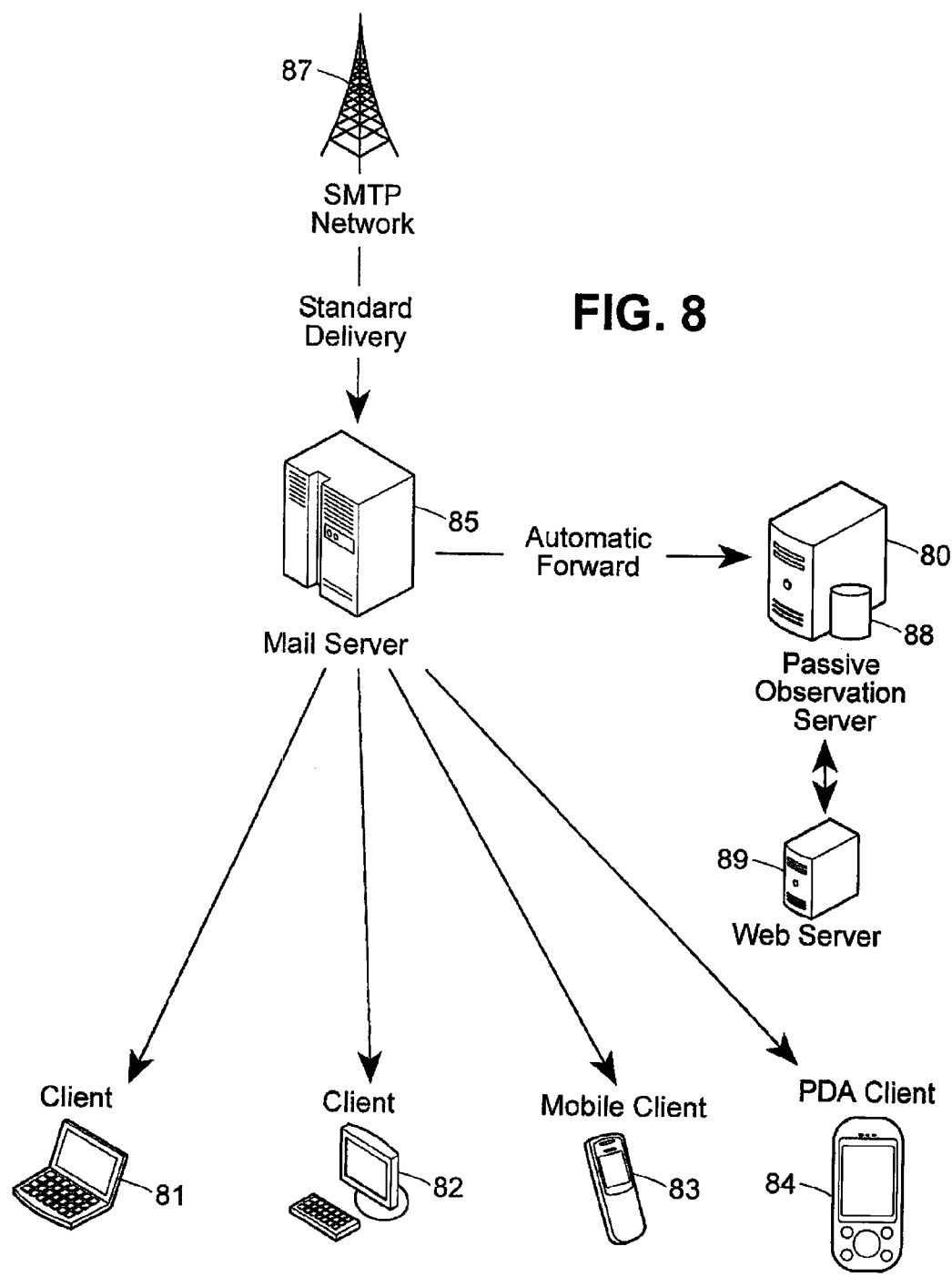
FIG. 8 is a schematic illustration of a passive observation and aggregation system for received messages, in accordance with another embodiment of the disclosure.

The foregoing description has focused on embodiments involving outgoing messages from a user, particularly email messages. It will be appreciated that other embodiments may emphasize incoming messages (that is, passive observation of responses instead of dispatches). FIG. 8 is a schematic illustration of a system for passive observation of responses, in accordance with another embodiment of the disclosure. In this embodiment, a user chooses to record all incoming email using any of a variety of forwarding systems, including but not limited to: (1) client software that automatically forwards all incoming email to a given address, and (2) systems that allow users to log in and collect email without affecting the state of the email. Client software performing automatic forwarding may use a personalized secret address as described above with reference to outgoing messages. The response observation system verifies that the recipient of the email matches the owner of the personalized secret address to which the email was automatically forwarded.

As shown in FIG. 8, an email incoming over the SMTP network 87 is received at mail server 85 and is automatically forwarded to passive observation server 80. The email is delivered to the recipient(s) operating one or more of a variety of devices, including a notebook computer 81, a desktop computer 82, a mobile telephone 83, and/or a PDA 84. Collected data regarding the message (e.g. sender ID, recipients' ID, date and time of the message, type of message, and/or the message content) is stored in database 88. The passive observation server is also connected to a Web server 89 in order to execute various applications on the collected data.

It will be appreciated that a passive dispatch observation system and a passive response observation system may operate together, so that message data from either outgoing or incoming messages may be collected in a single database. This database may be mined for many types of information, including but not limited to:

1. Social information regarding a network including the user and others;
2. Social information regarding a network including others (persons other than the user included in one message);
3. Relationships between subject matter features in the message (textual features) and others; and
4. Temporal information about the user and others (i.e. patterns of behavior).

As described above, the message data may then be reused through (for example) Web services, a web application, or LDAP to provide relationship information for any application.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A method comprising:
   receiving, via an observation server computer, an electronic communication message transmitted over a network between a user and a contact;

storing, in a communication database, data associated with the message, the associated data including message content, user identification information and contact identification information;

determining, via the observation server computer, a contact value for the contact relative to a community of the user, the community comprising the user and contacts as members of the community and member groupings of the community of the user;

extracting, via the observation server computer, relationship data from the message content, the user identification information and the contact identification information, the relationship data extracted from the message content, the user identification information and the contact identification information is utilized to identify relationships associated with the user, the contact, and the community, the message is one of a plurality of messages, the relationship data extracted from each message of the plurality is used to identify the members of the community, relationships among the members of the community and relationships among the member groupings of the community; and compiling, via the observation server computer, statistics relating to at least one of the user, the contact, and the community.

2. A method according to claim 1, wherein said receiving an electronic communication message further comprises:

obtaining a forwarding address from the message, the forwarding address directs a copy of the message to an observation system that performs the extracting; and verifying that the forwarding address is associated with the user by verifying that the forwarding address is the user's personalized address stored on the database.

3. A method according to claim 1, wherein said extracting relationship data further comprises:

building a map of relationships of the user, the contact, and members of the community; and monitoring the map with respect to changes over time.

4. A method according to claim 1, wherein said extracting relationship data further comprises:

compiling a contact list for the user;

sorting the contact list in accordance with a category of information;

storing the contact list and the statistics in a contact database; and providing access to the contact database to a software application.

5. A method according to claim 1, wherein the community of the user is one of a plurality of communities, each community comprising one or more contacts of a plurality of contacts, said determining further comprising:

making a determination whether said contact provides a bridge between the community of the user and at least one other community of said plurality of communities;

assigning the contact value for the contact in accordance with the determination, said contact value being a higher contact value relative to the contact values of non-bridge contacts of the plurality of contacts in a case that said contact is determined to provide a bridge between the community of the user and the at least one other community.

6. A method according to claim 5, said method further comprising:

reminding the user to maintain contact with said bridge contact.

7. A method according to claim 1, wherein said determining further comprises determining a ranking of the contact in the community.

8. A method according to claim 1, wherein said extracting relationship data further comprises:

extracting community data; and characterizing the community based on the message content, user identification information and contact identification information.

9. A method according to claim 1, wherein said statistics are variable with respect to at least one of (i) time of dispatch of the message, (ii) time of reception of the message, (iii) location of the user or the contact, and (iv) a medium by which the message is transmitted.

10. A system comprising:

an observation server computer configured to receive an electronic communication message transmitted between a user and a contact;

a communication database, connected to the observation server computer, for storing data associated with the message, the associated data including the message content, the user identification information and the contact identification information; and a contact engine implemented by the observation server computer, connected to the communication database, configured to determine a contact value for the contact relative to a community of the user, the community comprising the user and contacts as members of the community and member groupings of the community of the user, extract relationship data from the message content, the user identification information and the contact identification information, the relationship data extracted from the message content, the user identification information and the contact identification information is utilized to identify a relationships associated with the user, the contact, and the community, the message is one of a plurality of messages, the relationship data extracted from each message of the plurality is used to identify the members of the community, relationships among the members of the community and relationships among the member groupings of the community, and compile statistics relating to at least one of the user, the contact, and the community.

11. A system according to claim 10, wherein said observation server computer is configured to receive a copy of the message in accordance with a forwarding address in the message;

verify that the forwarding address is associated with the user; and store the forwarding address as a personalized address for the user in a user database.

12. A system according to claim 10, wherein said contact engine is configured to build a map of relationships of the user, the contact, and members of the community from the extracted data, wherein said contact engine is configured to monitor the map with respect to changes over time.

13. A system according to claim 10, wherein said contact engine is configured to compile a contact list for the user; and sort the contact list in accordance with a category of information.

14. A system according to claim 13, further comprising a contact database, connected to the contact engine, for storing the contact list and the statistics.

15. A system according to claim 10, wherein the community of the user is one of a plurality of communities, each community comprising one or more contacts of a plurality of contacts, said contact engine is configured to:

make a determination whether the contact provides a bridge between the community of the user and at least one other community of said plurality of communities;

assign the contact value for the contact in accordance with the determination, the contact value being a higher contact value relative to the contact values of non-bridge contacts of the plurality of contacts in a case that said contact is determined to provide a bridge between the community of the user and the at least one other community.

16. A system according to claim 14, wherein said contact engine is further configured to:

remind the user to maintain contact with said bridge contact.

17. A system according to claim 10, wherein said contact engine is configured to determine a ranking of the contact in the community.

18. A system according to claim 10, wherein said contact engine is configured to extract community data, wherein said contact engine is configured to characterize the community based on the message content, user identification information and contact identification information.

19. A system according to claim 10, wherein said contact engine is configured to compile statistics variable with respect to at least one of (i) time of dispatch of the message, (ii) time of reception of the message, (iii) location of the user or the contact, and (iv) a medium by which the message is transmitted.

20. A non-transitory computer-readable storage medium having tangibly stored therein instructions that, when executed by a server computer, perform a method comprising:

receiving an electronic communication message transmitted between a user and a contact;

storing, in a communication database, data associated with the message, the associated data including message content, user identification information and contact identification information;

determining a contact value for the contact relative to a community of the user, the community comprising the user and contacts as members of the community and member groupings of the community of the user;

extracting relationship data from the message content, the user identification information and the contact identification information, the relationship data extracted from the message content, the user identification information and the contact identification information is utilized to identify relationships associated with the user, the contact, and the community, the message is one of a plurality of messages, the relationship data extracted from each message of the plurality is used to identify the members of the community, relationships among the members of the community and relationships among the member groupings of the community; and compiling statistics relating to at least one of the user, the contact, and the community.

* * * * *